March 26, 1963    E. B. JENSEN    3,082,506
TIRE RASP

Filed April 29, 1959    2 Sheets-Sheet 1

INVENTOR
EMIL B. JENSEN

BY
Brown, Jackson, Boettcher & Dienner
ATTORNEYS

March 26, 1963  E. B. JENSEN  3,082,506
TIRE RASP

Filed April 29, 1959  2 Sheets-Sheet 2

INVENTOR
EMIL B. JENSEN
BY
Brown, Jackson, Boettcher & Dienner
ATTORNEYS

United States Patent Office 3,082,506
Patented Mar. 26, 1963

3,082,506
TIRE RASP
Emil B. Jensen, 8135 Stoney Island Ave., Chicago, Ill.
Filed Apr. 29, 1959, Ser. No. 809,801
18 Claims. (Cl. 29—79)

This invention relates to expendable blades for rasps such as are used in preparing the carcass of a rubber tire for vulcanizing, recapping or retreading. The application is a continuation in part of my copending application, Serial No. 669,987 filed July 5, 1957 now Patent No. 2,896,309 issued July 28, 1959.

It is well known that the useful life of a rubber tire can be lengthened by applying a new rubber wear surface to its body or carcass after the initial tread has worn and if there have been no serious breaks or other injury to the carcass. Before this is done, however, the tire must be subjected to treatment to remove as far as possible all old rubber and broken wire treads down to the fibre body of the tire. This is conventionally accomplished by moving the peripheral surface of the tire against a rapidly revolving tire rasp of cylindrical shape provided with teeth which act to loosen, tear and grind off the excess old rubber on the tire carcass and also to roughen the remaining surface or otherwise condition it to effectively bond to the new rubber applied in the vulcanizing or recapping operation.

Previous to the present invention, said teeth were usually formed by securing tacks or other pronged members in and about the cylindrical surface of the rasp with their sharpened ends protruding outwardly therefrom.

In my Patent No. 2,703,446 issued March 8, 1955, I disclose a rasp wherein said teeth comprise arcuate blades provided with a saw toothed outer-periphery and which were mounted on pairs of support pins extending at right angles between a front and a back cylindrically shaped end plate, and separated with spacers mounted adjacent each toothed blade upon said pins so that the toothed blades were presented edgewise to the periphery of the rasp and formed spaced rows of pointed teeth spiraling about the periphery of the rasp. The blades could be conveniently removed and replaced as the teeth became worn or were broken.

I have now found that by reshaping the working edge of such blades to comprise teeth of essentially dove tail shape as will be more fully described hereinafter and setting said teeth in generally parallel relation to each other and in transverse relation to the main body of the blade I can increase by several times the rate at which the old rubber can be removed from the tire carcass and while reducing the amount of heat developed. Therefore the blades will last much longer and do not need to be replaced as often. This feature I have found particularly set forth and claimed in my copending application mentioned above of which this patent application is a continuation in part.

I have also found that while obtaining said improvement in the removing of the old rubber from the tire carcass, I can simultaneously introduce a texture on the surface of the tire carcass as it is being cleared of excess old rubber to which the new rubber will most effectively bond or adhere when applied in the subsequent recapping step and vulcanized.

This I obtain by indenting the outer surface of said dove tailed shaped teeth to form a notch or radial cut which I extend to a substantial depth but less than one half the depth of the teeth and by offsetting the two halves in to which the outer edge of the teeth is thus divided to opposite sides of the general plane in which the teeth lie. In this manner I am able to provide a second edge which I have found will work on the surface of the tire carcass immediately behind the cutting edges of the teeth, as the rasp is rotated, to buff the cleared surface to a condition or texture which markedly increases the bond which can be effected between the carcass and the new rubber in the subsequent recapping and vulcanizing operation.

Thus a principal object of my invention as represented in the instant patent application is to provide a replaceable blade for a tire rasp having teeth adapted to remove the old rubber from a tire carcass at a rapid rate while developing a minimum amount of heat and simultaneously imparting a texture to the surface of the tire, as it is cleared of excess old rubber, to which the new rubber will strongly adhere when suitably vulcanized.

Another object of the invention is to provide a tire rasp with teeth having an improved shape by which it is adapted to impart an improved texture to the surface of a tire carcass as said carcass is cleared of excess old rubber and readied for application of new rubber in a subsequent recapping operation.

Still another object of the invention is to provide a removable blade for a tire rasp having dove-tail shaped teeth which in rotation of the rasp are presented at a small angle to the direction of rotation and which teeth have an indent in the form of a notch or cut in their outer edge adapted to present a further edge for buffing the surface of a tire carcass on which the rasp is operated to clear the same of excess old rubber.

Further more specific objects of the invention are to provide a replaceable blade of the aforesaid character which will not only obtain said improved results but will also run much cooler than prior art tire rasps although operated at considerably higher speeds.

Another more specific object is to provide such a blade which may be assembled in the rasp holder for rotation in either direction.

Still another specific object is to provide such a blade which is furthermore self sharpening.

Another object is to provide a blade having all of the aforesaid advantages and features while also being of a construction that is conveniently simple, economical and practical to manufacture.

Many other advantages, features and objects of the invention will be at once apparent or will become so from the more detailed description of the preferred forms of the invention which follow, reference being had to the accompanying drawings in which.

Figure 9:
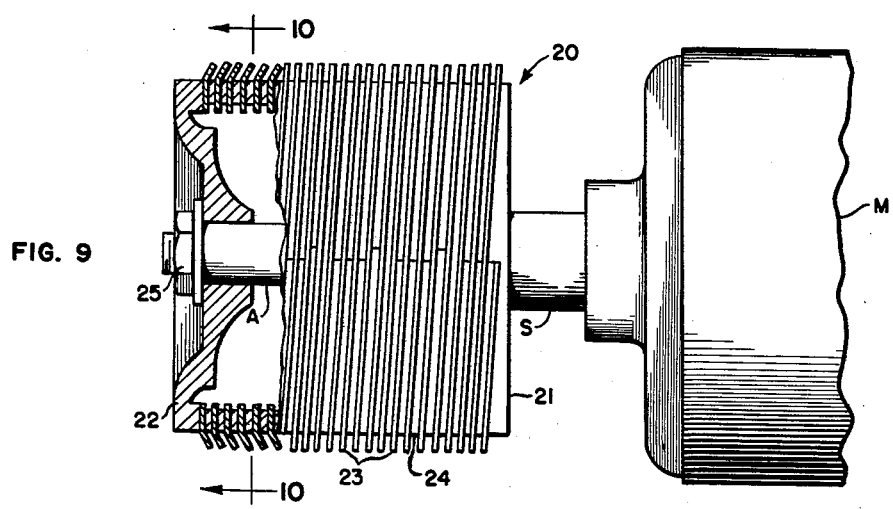
FIGURE 9 is a side elevational view of a tire rasp mounted upon the shaft or arbor of a motor, with parts broken in section, and showing the blades mounted thereon in their position of use.
Figure 10:
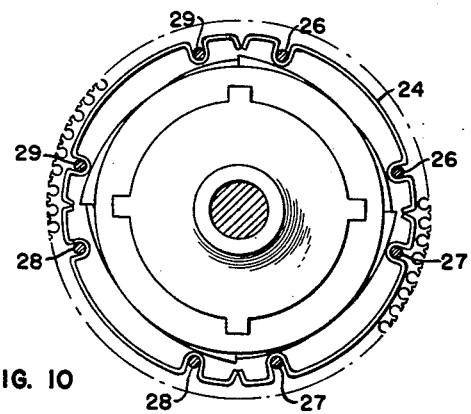
FIGURE 10 is a sectional view through the tire rasp taken on lines 10—10 of FIGURE 9.

Referring more particularly to the several views wherein like parts are identified by like reference numerals, and first to FIGURE 9, a tire rasp 20 is there illustrated as mounted upon an arbor or shaft A of a motor M, said shaft A having an enlarged shank S against which the back cylindrical plate 21 of the tire rasp is positioned, its front cylindrical plate 22 being mounted at the forward end of shaft A. Between said plates are supported quadrant shaped blades 23 and spacers 24, the entire assembly constituting the tire rasp 20 being fastened by means of a nut 25 or the like screw threadedly mounted on the end of shaft A. As shown best in FIGURES 10, 11 and 12, the back cylindrical plate 21 has four pairs of equally spaced support pins 26, 27, 28 and 29 extending transversely therefrom, the front cylindrical plate having complementary openings to receive the same. The quadrant shaped blades 23 which constitute the invention have a pair of openings 30 and 30A sized to receive the pins 21 and which openings are spaced apart a distance equal to the common spacing of the pins of each of said pairs 26, 27, 28 and 29. Although both openings 30 and 30A may be circular in shape complementing the cylindrical shape of the pins, I preferably give opening 30A an oval shape whereby the blades may be more easily and quickly assembled with said pairs of pins. The complementing circular shape of opening 30 assures that the blades when assembled on the pins cannot slide while the oval shape of opening 30A provides the desirable play for convenience in assembling with the mentioned pins.

Figure 11:
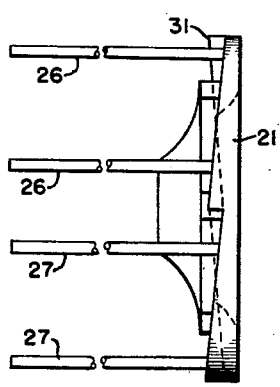
FIGURE 11 is a side elevational view of the rear end plate showing the support pins extending at right angles therefrom.
Figure 12:
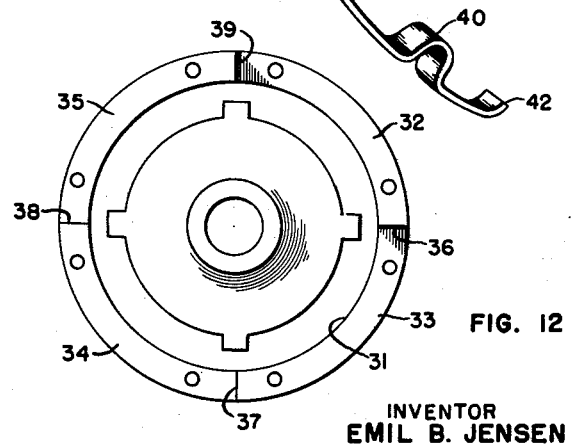
FIGURE 12 is a front view of the rear plate shown in FIGURE 4.

Both the back plate 21 and the front plate 22 are provided with a peripheral shoulder 31, said shoulder 31 being provided with four quadrant shaped tapered faces 32, 33, 34 and 35, the tapered face 32 sloping away from the outer edge of the plate and terminating in an abrupt shoulder 36, tapered face 33 terminating in a similar shoulder 37, face 34 in a shoulder 38 and face 35 in a shoulder 39. As best seen in FIGURE 11 the slope of each face is equal to about one-half the width of the plate 21 or 22 so that the blades 23 when mounted in the pins and placed thereagainst will be at an angle to the edge of the end plates 21 and 22 and provide a continuous spiral of cutters from the rear to the forward plate (see FIG. 9).

Figure 13:
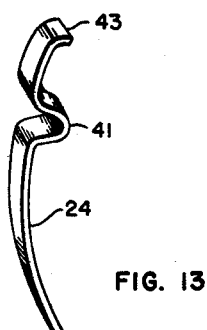
FIGURE 13 is a front perspective view of a preferred form of spacer.

In order to separate the spiral rows of cutters, spring clip spacer member 24 as illustrated in FIGURE 13 is preferred although any other means such as rings or discs may be utilized, if desired. Said spacer members 24 may be of any desired width and are formed with socket portions 40 and 41 to snap over a set of said support pins 26, 27, 28 or 29, and further have inwardly turned ends 42 and 43 forming ledges which frictionally engage against similar ledges of the spacer members mounted upon the pairs of spacer pins to either side thereof. Thus, as shown best in FIGURE 10, the spacer members 24 when placed into end-to-end engagement about the four pairs of support pins form a completely circular spacer between adjacent aligned rows of blades 23.

Figure 1:
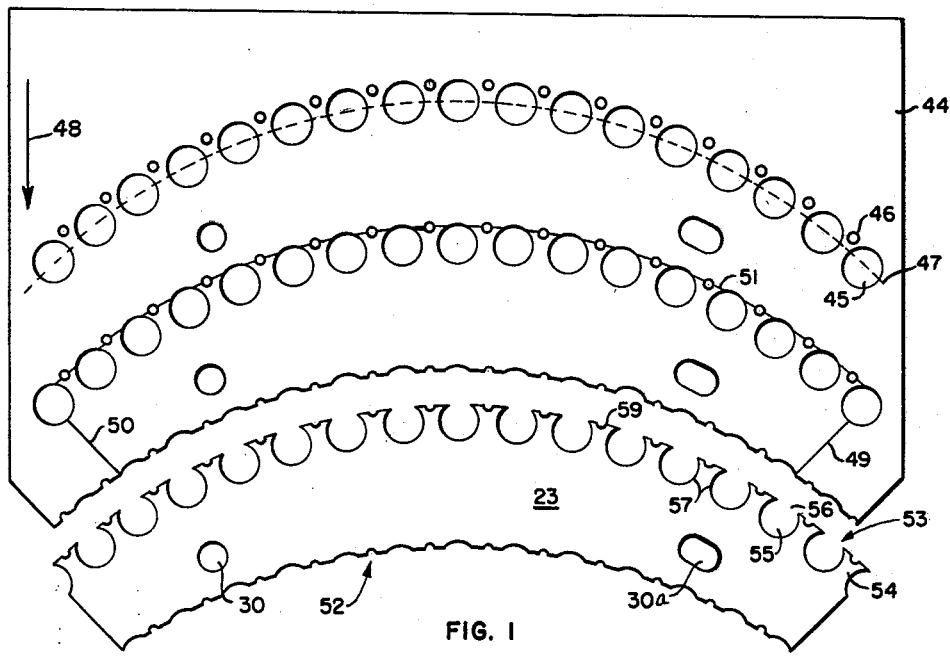
FIGURE 1 shows a strip of sheet metal and a blade constituting one form of the invention which has been cut therefrom and to illustrate the several steps employed in the blanking of the blade from said strip.

Referring now to FIGURE 1, it will be seen that the quadrant shaped blades 23 which constitutes the invention may be conveniently stamped or blanked from a strip 44 of sheet metal in a continuous operation by passing the strip through a series of cooperating cutting dies (not shown) in order to successively form therein at appropriate intervals series of equidistantly spaced equidimensioned circular openings 45 arranged in an arcuate form as illustrated and the radius of which corresponds to that of the rasp into which the blades are to be mounted. Simultaneously therewith or in a succeeding operation, small openings 46 are formed between each pair of said openings 45 and which smaller openings 46 will also be of circular shape and constant size. These smaller openings 46 are centered between each pair of openings 45 in the thicker portion of the space between each pair of circular openings 45 and disposed to lie to the rear of an imaginary line 47 which connect the centers of said circular openings 45 and when the strip 44 is considered as being drawn between the cutting dies in the direction indicated by arrow 48. Openings 30 and 30A may also be formed by portions of the same pair of cutting dies which form openings 45 and 46 or they may be formed in a separate operation.

The strip is then cut along radial lines 49 and 50 which intersect the center of the terminal ones of the series of openings 45 and along line 51 which passes through the center of the smaller openings 46. The blank which is thus separated from strip 45 constitutes a blade 23 having an inner serrated edge 52 of concaved arcuate shape which may be smoothed off to present a more finished appearance if desired although this is not necessary and only increases the expense of manufacturing. The blade also has an outer working edge of generally arcuate convexed shape indicated generally at 53 and defined by severance line 51. Said working edge 53, as seen in FIG. 1, comprises a plurality of generally dove-tail shaped radially extending teeth 54 of a predetermined constant size and shape and which are equidistantly spaced apart by circular cutouts 55 having a periphery which comprises the major arc of a circle and a mouth 56 communicating with the outer edge 53 of the blade which is essentially narrower than the diameter of said circular cutouts. The cutouts 55 thus provide the side edges 57 of each adjacent pair of teeth with a generally concaved shape wherefor the opposed side edges of said teeth 54 are in generally outwardly diverging relation and affording thereto their so-called "dove tail" shape. The generally convexed outer edge of said teeth 54 are furthermore indented by means of notch 59 of essentially semi-circular shape which results by the aforementioned location of severance line 51 to pass through the centers of the smaller openings 46. The depth to which the notches 59 extend into the body of the teeth is controlled to lie wholly within the wider portion of the teeth or so that they may be said to have a radius or depth that is less than one half the total depth of the teeth 54 themselves. Desirably said notches are also equidistantly spaced between end points 60 where the convexed outer edge 58 of said teeth meet the concaved divergingly related side edges 57 of said teeth.

Figure 2:
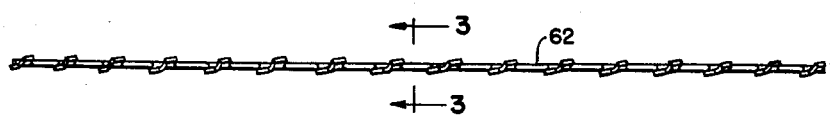
FIGURE 2 is a top plan view of a blade shown in FIGURE 1 and to illustrate the set which is applied to the teeth of said blade after it has been stamped or cut from said strip of sheet stock.

The blades by reason of the aforedescribed shape of their teeth 54 are adapted for rotation by rasp 20 in either direction of their elongation. Points 60 of said teeth serve to dig into the rubber material of the tire carcass as the rotating rasp in which they are mounted is brought into contact therewith, said concaved side edges 57 serving to shear large elongated slivers of the rubber from the contacted portion of the tire carcass which are raised by said ends 60 as the rasp rotates. In order that said side edges 57 will effectively serve their purpose, the teeth 54 are angled 10 or 15 degrees from the plane of the main body of the blades and so as to extend in transverse relation to said main body of the blade and in essentially parallel relation to each other. This is illustrated best in FIGURE 2. Although the above mentioned "lineal" set of the teeth is to be preferred, the angle at which said teeth 54 extend transversely of the plane of the blade can be varied within the wider range of 5 to 25 degrees in accordance with the size and number of teeth and their spacing in a particular blade. The resistances of the rubber to the abrading action of the teeth and the speed at which the rasp is rotated as well as the skill of the operator who is using the rasp are also controlling factors in determining the proper angling for said teeth.

For removing excess old rubber from the carcass of conventionally sized automobile tires, I have found that a nine inch diametered rasp works satisfactorily although for particular operations, larger or smaller rasps may be preferred ordinarily within the range of from 4 to 13 inches in diameter. Furthermore, although not definitive of the invention, I also prefer to provide the working edge 53 of such blades, which in the case of a 9 inch diameter rasp will have a length equal to 90° of a nine inch diametered circle, with sixteen teeth which I equidistantly size and space by the aforedescribed cutouts 55 each having a diameter equal to about .312 inch, a communicating mouth 56 which equals about .25 inch and which mouth is spaced out from the center of said circular cutouts a distance of about .062 inch. In actual tests with blades so dimensioned I have found that by setting their teeth in generally parallel planes at approximately 10° to the plane of said blades, they will run approximately 60% cooler than the saw toothed type blade shown in my prior Patent No. 2,703,446 and while also cutting off the rubber from the tire carcass up to three times as fast.

Where the rasps are of larger diameter than the aforementioned 9 inches, I prefer to increase the number of blades necessary to complete the circle rather than to enlarge the blades themselves. Thus in the case of a thirteen inch diameter rasp, each blade will have a length equal to 60° of a 13 inch diametered circle. Of course in such a larger diametered rasp, the number of pairs of support pins as well as shoulders and tapered faces on plates 21 and 22 will also be increased to accommodate the larger number of blades.

It will also be understood that the number of teeth I provide in my blades can be varied in accordance with specific work requirements although the same related proportions in the size and spacing of the teeth will be observed.

Simultaneously with said rapid and efficient clearing of excess old rubber from a tire carcass, I am also able to introduce a buffing action on the surface of the tire carcass which further conditions it and gives to the cleared surface a texture to which the newly applied rubber will much more strongly bond in the subsequent vulcanization thereof. This I obtain by means of the trailing one of the two side edges 61 of the notch 59 in the outer edge of each tooth 54 which engages the tire carcass surface immediately behind its cutting edge 57. By reason of the much smaller depth of said edge 61 of the notches and its more nearly radial or receding relation to the direction of travel of the teeth, in rotation of the rasp, as compared with the forward projection of the cutting edge 57, said trailing edges 61 of the notches serves to finely buff the surface of the tire carcass which has been cleared by the leading side edge 57 of the teeth to provide a texture having a velvet sensation to the touch and which in appearance is much duller than the surface which remained where unnotched teeth are employed.

Although it will be apparent that at least some portion of the trailing side edge 61 of each notch will be presented to the contacted surface of the tire carcass during rotation of the rasp solely because the blades are mounted in the rasp 20 at a slight angle to the axis A about which it is rotated to achieve the spiral effect required, the buffing effect is only nominal unless the speed of rotation of the tire to that of the rasp is carefully controlled. Therefore, in order to assure the desired buffing action, I have found it essential to deflect the two portions 62 of the outer edge of the teeth into which the notch 59 divides said edges so that one portion is deflected laterally to the left and the other portion an equal amount to the right. Actually if each of portions 62 is thus laterally deflected an amount equal to about one-half the thickness of the sheet metal, this will be sufficient to expose the trailing edge 61 of the notch to accomplish the required buffing action. Such a deflection which I term "radial" is equal to about 15° and is the preferred radial set where the lineal set of the teeth i.e. that is the angle at which the teeth are set with respect to the longitudinal plane of the blade body, is in the range of 10 to 15 degrees. Preferably the radial set of said portions 62 is kept within the range of 15 to 30 degrees, although the maximum limits appear to be within the wider range of 10 to 45 degrees. Where the radial set of said portions 62 is in the upper range that is between 30 and 45 degrees, the "lineal" set of the teeth, that is, their transverse relation to the main body of the blade, may be reduced and even eliminated under some circumstances.

In tests conducted with a 9 inch diametered rasp provided with four 16 toothed quadrant blades of the aforedescribed dimensions and wherein the notches 59 were formed to a depth of about 7/64 inch and portions 62 were radially set at 15 degrees, that is were deflected laterally a distance equal to about .014 inch (the total thickness of the sheet metal being approximately .028 inch), the holding strength of the rubber newly applied to the thus cleared and buffed surface, when vulcanized according to conventional manner, was determined in the instant tests, by actual measurements, to have a strength at least as high as 150 p.s.i. which is about 5 times that determined by the Federal Government as a standard which the newly applied rubber in a recapped tire should meet.

Figure 4:
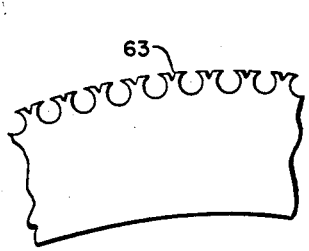
FIGURES 4, 5 and 6 are fragmentary side elevational views of further forms the invention may take.
Figure 6:
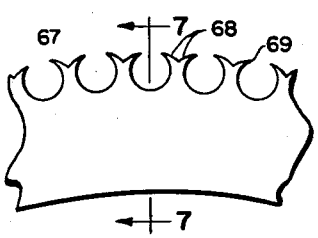

Although I have found the best buffing action on the cleared surface of a tire carcass to be obtained where the notches 59 which I form in the outer edge 58 of the dovetailed teeth 54 have the aforedescribed hemi-circular shape, I have also been able to obtain a good buffing action where the notch has a V-shape as illustrated at 63 in FIGURE 4. Likewise, although still less satisfactory than either the aforementioned hemi-circular or V-shaped notches, I can also obtain a buffing action where instead of notching the outer edge 58 of the teeth 54, I merely slit the teeth as at 64 in a direction radial to the convex arcuate shape of the outer edge 53 of said blades and laterally deflect portions 65 thereof in a manner as described with regard to portion 62 in the embodiment according to FIGURES 1, 2 and 3. Not only do I find that the receding relation the side edges of the hemi-circular or V shaped notches have to the direction of travel of the teeth produces a more satisfactory texture in their buffing action on the tire carcass but I have also found that the notching of said edge of the teeth increases the cooling effect on the overall buffing and cutting operation, therefor permitting the blades to be run at higher speeds and further increasing the overall efficiency of the rasp into which the blades are mounted.

Figures 3, 7:
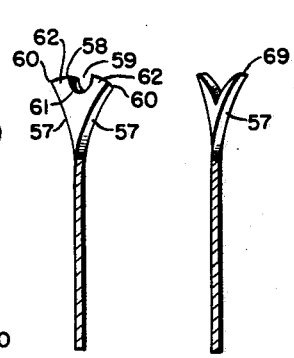
FIGURE 3 is a sectional view taken along lines 3—3 in FIGURE 3; and looking in the direction indicated by the arrows.
FIGURE 7 is a sectional view taken along lines 7—7 in FIGURE 6.
Figure 5:
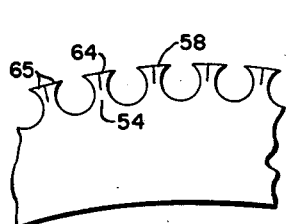

Moreover instead of confining the notch to a small portion of the outer edge 58 of the teeth 54, I can extend the sides of the notch to their sharpened ends 69 as illustrated at 67 in FIGURE 7 whereby the portions 68 into which the upper edge is thus divided take on the appearance of a pair of outwardly diverging prongs, which taper to the essentially sharp ends 69 required for digging into the rubber during the cutting action of the side edges 57. However, where the notch occupies only a portion of the outer edge 58 of the teeth as in the embodiments according to FIGURES 1, 4 and 5 the rubber which is being cleared by the leading side edge 57 can be more easily guided by the more nearly flat outer edge of the two divisions to provide a sharpening action on the trailing end 60 of the teeth. It will of course be understood that as the blades are used, there is a gradually wearing away of the leading edge 57 particularly at their leading points 60. When said leading points 60 of the teeth become sufficiently blunted, the blades may be reversed so that the opposite edge 57 and its end 60 lead and impart the cutting action on the rubber. When the blades are thus reversed, the rubber as it is cleared and guided across the outer edge 58 of the tooth, it also wears on said outer edge of the teeth effect a hone or sharpening of the now trailing blunted end 60 wherefor by the time its leading end 60 is dulled, said trailing end will again be sufficiently sharpened that the blades can again be reversed. This of course maximizes the useful life of the blades.

Figure 8:
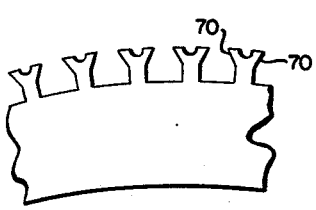
FIGURE 8 is a fragmentary view showing an alternate form of cutting edges with which the teeth of my blade might be formed.

Finally although the aforedescribed concave shape of the outwardly diverging side edges 57 of the teeth 54 is to be preferred, some cutting advantage may also be obtained where the sides although divergingly related are more nearly linear than concaved. A blade having linear shaped diverging side edges 70 is shown in FIGURE 8, the teeth of such a blade including their notched portions being otherwise constructed substantially as in any of the embodiments illustrated by FIGURES 1, 4, 5 or 7.

From the aforedescription it will be apparent that all of the recited advantages, features and objects of the invention have been demonstrated as obtainable in a convenient simple practical manner. Furthermore it will be understood that the aforedescription is not to be taken in a limiting sense but merely as illustrative of the invention, the metes and bounds of which are defined by the hereunto appended claims which are to be read and interpreted as broadly as is permitted by the existing prior art.

Now having described my invention, I claim:

1. A replaceable blade for a rotatable rasp used to remove rubber from the carcass of a rubber tire, said blade comprising a sheet metal member having an essentially planar main body and an interrupted working edge of convexed arcuate shape, said working edge comprising a plurality of spaced generally dove-tail shaped teeth transversely related to the plane of said main body portion, said teeth each having a pair of similarly shaped outwardly diverging side cutting edges and an outer edge having an indent therein to a depth less than half the depth of said teeth, the portions of said outer edge of the teeth on either side of said indent being laterally offset from each other so as to present the side edges of said indent for buffing the surface of the rubber tire carcass on which the cutting edges of the teeth act.

2. A replaceable blade according to claim 1 wherein said indent comprises a slit disposed radially to the curvature of the working edge of said blade.

3. A replaceable blade according to claim 1 wherein said indent comprises a semi-circular shaped notch.

4. A replaceable blade according to claim 1 wherein said indent comprises an essentially V-shaped notch.

5. A replaceable blade for a rotatable rasp used to remove rubber from the carcass of a rubber tire, said blade comprising a sheet metal member having an essentially planar main body and an interrupted working edge of convexed arcuate shape, said working edge comprising a plurality of spaced generally dove-tail shaped teeth, said teeth being disposed generally parallel to each other and extended transversely across the main body of said blade, said teeth each having a pair of similarly shaped outwardly diverging side cutting edges and an outer edge which forms with said side cutting edges a pair of relatively sharp points, the outer edge of said teeth having an indent therein spaced midway of said points and to a depth less than half the depth of said teeth, and the portions of said outer edge of the teeth on either side of said indent being laterally offset from each other whereby the trailing edge of the indent may be presented for buffing the surface of a tire carcass on which the leading cutting edge of the teeth act when the blade is mounted in a rasp and used to remove rubber from the tire carcass.

6. A replaceable blade for a rotatable rasp used to remove rubber from the carcass of a rubber tire, said blade comprising a sheet metal member having an essentially planar main body and an interrupted working edge of convexed arcuate shape, said working edge comprising a plurality of spaced generally dove-tail shaped teeth, the outer portions of which teeth are generally parallel to each other and transversely related to the plane of the main body of said blade, said teeth each having oppositely arranged concave shaped side cutting edges and an outer edge having an indent wherein which extends to a depth less than half the depth of said teeth, and the two opposed side edges of the indent in the outer surface of each said teeth being laterally offset from each other so as to be useful for buffing the surface of a rubber tire carcass on which the cutting edges of the teeth act.

7. A replaceable blade for a rotatable rasp used to remove rubber from the carcass of a rubber tire, said blade comprising a sheet metal member having an essentially planar main body and an interrupted working edge of convexed arcuate shape, said working edge comprising a plurality of spaced generally dove-tail shaped teeth, which teeth are generally parallel to each other and transversely related to the plane of the main body of said blade, said outer portions of the teeth having outwardly diverging side edges and an outer edge provided with an indent therein having side edges for buffing the surface of a tire carcass from which rubber is cleared by the cutting edges of said teeth, and the portions of the teeth on either side of said indent being laterally offset from each other.

8. A replaceable blade for a rasp used to remove rubber from the carcass of a tire and to buff its remaining surface, said blade comprising a sheet metal member of essentially uniform thickness having a planar main body and an interrupted outer working edge of generally convexed arcuate shape, said main body portion having means spaced from said arcuate working edge by which the blade may be removably mounted on a tire rasp, and said arcuate working edge including a plurality of cutouts which directly interrupt said edge and form teeth of generally dove tail shape between each adjacent pair of cutouts, said teeth being of uniform size, constant thickness and each characterized by essentially parallel opposed surfaces and oppositely disposed outwardly diverging trailing and leading edges each tooth further having a convexed upper surface containing a radially disposed notch extending to a depth less than half the depth of the teeth, said teeth being disposed in transverse relation to the plane of said main body portion and generally parallel to each other.

9. A replaceable blade for a rasp as claimed in claim 8 wherein the cutouts between each adjacent pair of said teeth define a major arc of constant diameter having a mouth interrupting the outer edge of the blade and which mouth is of a width less than the diameter of said major arc.

10. A replaceable blade for a rasp used to remove rubber from the carcass of a tire and to buff its remaining surface, said blade comprising a sheet metal member of essentially uniform thickness having a planar main body and an interrupted outer working edge of generally convexed arcuate shape, said main body portion having means spaced from said arcuate working edge by which the blade may be removably mounted on a tire rasp, and said arcuate working edge including a plurality of cutouts which directly interrupt said edge and form teeth of generally dove tail shape between each adjacent pair of cutouts, said teeth being of uniform size, constant thickness and each characterized by essentially parallel opposed surfaces and oppositely disposed outwardly diverging trailing and leading edges and further having an indent in the upper surface thereof which extends to a depth less than half the depth of the teeth and divides said outer edge of the teeth into two portions, said two portions being laterally oppositely offset from each other, and said teeth being generally disposed in transverse relation to the plane of said main body portion and generally parallel to each other.

11. A replaceable blade for a rasp as claimed in claim 10 wherein the cutouts between each adjacent pair of said teeth define a major arc of constant diameter having a mouth interrupting the outer edge of the blade and which mouth is of a width less than the diameter of said major arc.

12. A replaceable blade for a rasp used to remove rubber from the carcass of a tire and buff the remaining surface, said blade comprising a sheet metal member of essentially uniform thickness having a main body and an interrupted outer working edge of generally convexed arcuate shape, said main body portion having means spaced from said arcuate working edge by which the blade may be removably mounted on a tire rasp, and said arcuate working edge including a plurality of equi-shaped, constant sized, circular cutouts which directly interrupt said edge and form teeth of generally dove tail shape between each adjacent pair of cutouts, said teeth being transversely related to the plane of said body portion and each having its leading and trailing edges defined by the curvature of said cutouts, said teeth being of uniform size, constant thickness and each characterized by essentially parallel opposed surfaces and oppositely disposed concave shaped trailing and leading cutting edges which extend out to the outer edge of the blade and form a sharp angle therewith, said outer edge of each tooth containing an indent having at least its trailing side edge disposed for buffing the surface of a tire carcass from which rubber is removed by the leading cutting edge of the tooth when the blade is mounted in a rasp and the rasp is used to pull rubber from a tire carcass, and the cutouts between each adjacent pair of said teeth defining a major arc of constant diameter having a mouth interrupting the outer edge of the blade and which mouth is of a width less than the said diameter of said major arc.

13. A replaceable blade according to claim 1 wherein the teeth extend across the main body of the blade in essentially parallel relation to each other and at an angle of about 10 to 15° to the main body.

14. A replaceable blade according to claim 1 wherein the teeth extend across the main body of the blade in essentially parallel relation to each other and at an angle of about 5 to 25° to the main body.

15. A replaceable blade according to claim 1 wherein the portions of said outer edge of the teeth on either side of the indent are offset from the plane of the remainder of the teeth a distance equal to about one-half the thickness thereof.

16. A replaceable blade according to claim 1 wherein the portions of said outer edge of the teeth on either side of the indent are offset from the plane of the remainder of the teeth at an angle of about 15° thereto.

17. A replaceable blade according to claim 1 wherein the portions of said outer edge of the teeth on either side of the indent are offset from the plane of the remainder of the teeth at an angle of about 15 to 30° thereto.

18. A replaceable blade according to claim 1 wherein the portions of said outer edge of the teeth on either side of the indent are offset from the plane of the remainder of the teeth at an angle of about 10 to 45° thereto.

References Cited in the file of this patent

UNITED STATES PATENTS

| | | |
|---|---|---|
| 7,200 | Ustick | Aug. 11, 1832 |
| 59,951 | Boynton | Nov. 26, 1866 |
| 175,330 | Boynton | Mar. 28, 1876 |
| 576,724 | Foster | Feb. 9, 1897 |
| 2,633,880 | Mattson | Apr. 7, 1953 |
| 2,703,446 | Jensen | Mar. 8, 1955 |
| 2,896,309 | Jensen | July 28, 1959 |

FOREIGN PATENTS

| | | |
|---|---|---|
| 7,844 | Sweden | Jan. 30, 1897 |